US012695191B2

(12) United States Patent
Tai et al.

(10) Patent No.: US 12,695,191 B2
(45) Date of Patent: Jul. 28, 2026

(54) HYBRID ANTENNA STRUCTURE

(71) Applicant: Wistron NeWeb Corp., Hsinchu (TW)

(72) Inventors: Chih-Feng Tai, Hsinchu (TW); Kuei-Cheng Wang, Hsinchu (TW); Ting-Yu Zhang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 84 days.

(21) Appl. No.: 19/009,133

(22) Filed: Jan. 3, 2025

(65) Prior Publication Data

US 2025/0286277 A1 Sep. 11, 2025

(30) Foreign Application Priority Data

Mar. 6, 2024 (TW) ................................ 113108136

(51) Int. Cl.

*H01Q 5/378* (2015.01)
*H01Q 5/328* (2015.01)
*H01Q 9/40* (2006.01)
*H01Q 9/42* (2006.01)

(52) U.S. Cl.

CPC ............ *H01Q 5/378* (2015.01); *H01Q 5/328* (2015.01); *H01Q 9/40* (2013.01); *H01Q 9/42* (2013.01)

(58) Field of Classification Search

CPC .. H01Q 1/38; H01Q 1/44; H01Q 5/30; H01Q 5/307; H01Q 5/314; H01Q 5/321; H01Q 5/328; H01Q 5/335; H01Q 5/342; H01Q 5/35; H01Q 5/357; H01Q 5/364; H01Q 5/371; H01Q 5/378; H01Q 5/385; H01Q 5/392; H01Q 9/30; H01Q 9/40; H01Q 9/42

See application file for complete search history.

(56) References Cited

U.S. PATENT DOCUMENTS

| | | | | |
|---|---|---|---|---|
| 9,413,058 B1 * | 8/2016 | Kuo | ...................... | H01Q 5/335 |
| 2016/0065260 A1 * | 3/2016 | Heikura | ............... | H04B 1/3838 455/575.5 |

FOREIGN PATENT DOCUMENTS

| | | |
|---|---|---|
| TW | 201818612 A | 5/2018 |
| TW | 202327166 A | 7/2023 |

* cited by examiner

*Primary Examiner* — Robert Karacsony

(74) *Attorney, Agent, or Firm* — McClure, Qualey & Rodack, LLP

(57) ABSTRACT

A hybrid antenna structure includes a ground element, a main radiation element, a feeding radiation element, a shorting radiation element, an auxiliary radiation element, a proximity sensor, a dielectric substrate, an inductor, a first capacitor, a second capacitor, and a third capacitor. The main radiation element is coupled through the first capacitor to a first grounding point on the ground element. The feeding radiation element has a feeding point. The shorting radiation element is coupled to the main radiation element, and is coupled through the second capacitor to the feeding radiation element. The shorting radiation element is further coupled through the third capacitor to a second grounding point on the ground element. The auxiliary radiation element is coupled to the main radiation element. The auxiliary radiation element is adjacent to the feeding radiation element. The proximity sensor is coupled through the inductor to the main radiation element.

20 Claims, 3 Drawing Sheets

HYBRID ANTENNA STRUCTURE

CROSS REFERENCE TO RELATED APPLICATIONS

This application claims priority of Taiwan Patent Application No. 113108136 filed on Mar. 6, 2024, the entirety of which is incorporated by reference herein.

BACKGROUND OF THE DISCLOSURE

Field of the Disclosure

The disclosure generally relates to a hybrid antenna structure, and more particularly, to a wideband hybrid antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHZ, 850 MHz, 900 MHz, 1800 MHZ, 1900 MHZ, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE DISCLOSURE

In an exemplary embodiment, the disclosure is directed to a hybrid antenna structure that includes a ground element, a main radiation element, a feeding radiation element, a shorting radiation element, an auxiliary radiation element, a proximity sensor, an inductor, a first capacitor, a second capacitor, and a third capacitor. The main radiation element is coupled through the first capacitor to a first grounding point on the ground element. The feeding radiation element has a feeding point. The shorting radiation element is coupled to the main radiation element, and is coupled through the second capacitor to the feeding radiation element. The shorting radiation element is further coupled through the third capacitor to a second grounding point on the ground element. The auxiliary radiation element is coupled to the main radiation element. The auxiliary radiation element is adjacent to the feeding radiation element. The proximity sensor is coupled through the inductor to the main radiation element.

BRIEF DESCRIPTION OF DRAWINGS

The disclosure can be more fully understood by reading the subsequent detailed description and examples with references made to the accompanying drawings, wherein.

DETAILED DESCRIPTION OF THE DISCLOSURE

Figure 1:
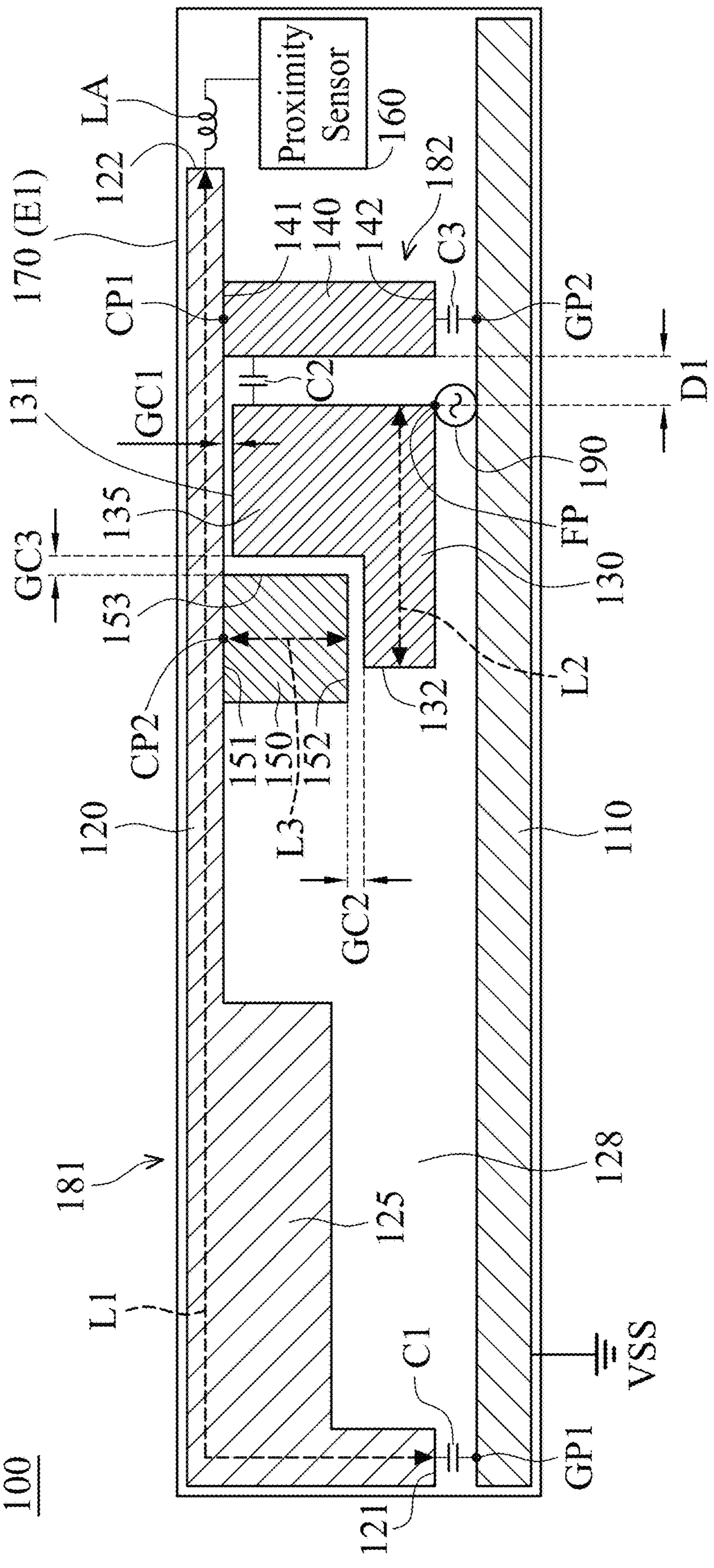
FIG. 1 is a diagram of a hybrid antenna structure according to an embodiment of the disclosure.

In order to illustrate the purposes, features and advantages of the disclosure, the embodiments and figures of the disclosure are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a hybrid antenna structure 100 according to an embodiment of the disclosure. The hybrid antenna structure 100 may be applied to a mobile device, such as a smart phone, a tablet computer, or a notebook computer. In the embodiment of FIG. 1, the hybrid antenna structure 100 includes a ground element 110, a main radiation element 120, a feeding radiation element 130, a shorting radiation element 140, an auxiliary radiation element 150, a proximity sensor 160, a dielectric substrate 170, an inductor LA, a first capacitor C1, a second capacitor C2, and a third capacitor C3. The ground element 110, the main radiation element 120, the feeding radiation element 130, the shorting radiation element 140, and the auxiliary radiation element 150 may all be made of metal materials, such as copper, silver, aluminum, iron, or their alloys.

The ground element 110 is configured to provide a ground voltage VSS. For example, the ground element 110 may be implemented with a ground copper foil. In some embodiments, the ground element 110 is further coupled to a system ground plane (not shown) of the hybrid antenna structure 100. In addition, there are a first grounding point GP1 and a second grounding point GP2 on the ground element 110. The first grounding point GP1 and the second grounding point GP2 may be different from each other.

The main radiation element 120 is coupled through the first capacitor C1 to the first grounding point GP1 on the ground element 110. Specifically, the main radiation element 120 has a first end 121 and a second end 122. A terminal of the first capacitor C1 is coupled to the first end 121 of the main radiation element 120, and another terminal of the first capacitor C1 is coupled to the first grounding point GP1. In some embodiments, the main radiation element 120 substantially has a relatively large L-shape, but it is not limited thereto. In some embodiments, the main radiation element 120 further includes a bending and widening portion 125, which may substantially have a rectangular shape.

The feeding radiation element 130 has a first end 131 and a second end 132. A feeding point FP may be positioned at a corner of the feeding radiation element 130. The second end 132 of the feeding radiation element 130 is an open end. The feeding point FP may be further coupled to a signal source 190. For example, the signal source 190 may be an RF (Radio Frequency) module for exciting the hybrid antenna structure 100. In some embodiments, the feeding radiation element 130 further includes an extension portion 135 positioned at the first end 131, and the extension portion 135 substantially has another rectangular shape. Because of the aforementioned extension portion 135, a coupling gap GC1 may be formed between the first end 131 of the feeding radiation element 130 and the main radiation element 120. In some embodiments, the feeding radiation element 130 substantially has a relatively small L-shape (compared with the main radiation element 120), but it is not limited thereto. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The shorting radiation element 140 is coupled through the second capacitor C2 to the feeding radiation element 130. Specifically, the shorting radiation element 140 has a first end 141 and a second end 142. The first end 141 of the shorting radiation element 140 is coupled to a first connection point CP1 on the main radiation element 120. A terminal of the second capacitor C2 is coupled to the first end 131 of the feeding radiation element 130, and another terminal of the second capacitor C2 is coupled to the first end 141 of the shorting radiation element 140. In addition, the shorting radiation element 140 is further coupled through the third capacitor C3 to the second grounding point GP2 on the ground element 110. That is, a terminal of the third capacitor C3 is coupled to the second end 142 of the shorting radiation element 140, and another terminal of the third capacitor C3 is coupled to the second grounding point GP2. In some embodiments, the shorting radiation element 140 substantially has a straight-line shape, but it not limited thereto.

The auxiliary radiation element 150 is coupled to the main radiation element 120. Specifically, the auxiliary radiation element 150 has a first end 151, a second end 152, and a side 153. The first end 151 of the auxiliary radiation element 150 is coupled to a second connection point CP2 on the main radiation element 120. The second end 152 of the auxiliary radiation element 150 is an open end. The second connection point CP2 may be different from the first connection point CP1. The auxiliary radiation element 150 is adjacent to the feeding radiation element 130. For example, a coupling gap GC2 may be formed between the second end 152 of the auxiliary radiation element 150 and the feeding radiation element 130, and another coupling gap GC3 may be formed between the side 153 of the auxiliary radiation element 150 and the feeding radiation element 130. In some embodiments, the auxiliary radiation element 150 substantially has a rectangular shape or a square shape, but it is not limited thereto.

In some embodiments, the feeding radiation element 130, the shorting radiation element 140, and the auxiliary radiation element 150 are at least partially surrounded by the main radiation element 120. In alternative embodiments, a slot region 128 is defined between the ground element 110 and the main radiation element 120. The feeding radiation element 130, the shorting radiation element 140, and the auxiliary radiation element 150 may all be disposed inside the slot region 128.

The proximity sensor 160 is coupled through the inductor LA to the main radiation element 120. For example, a terminal of the inductor LA may be coupled to the second end 122 of the main radiation element 120, and another terminal of the inductor LA may be coupled to the proximity sensor 160. However, the disclosure is not limited thereto. In alternative embodiments, the proximity sensor 160 is coupled through the inductor LA to any other position on the main radiation element 120, without affecting the performance thereof. Generally, the main radiation element 120 is configured as a sensing pad of the proximity sensor 160, thereby increasing the detectable distance of the proximity sensor 160.

The dielectric substrate 170 may be an FR4 (Flame Retardant 4) substrate, a PCB (Printed Circuit Board), or an FPC (Flexible Printed Circuit). In some embodiments, the ground element 110, the main radiation element 120, the feeding radiation element 130, the shorting radiation element 140, and the auxiliary radiation element 150 are all disposed on the same surface E1 of the dielectric substrate 170. In other words, the hybrid antenna structure 100 belongs to a planar antenna structure, so as to reduce the overall manufacturing cost. In alternative embodiments, the proximity sensor 160, the inductor LA, the first capacitor C1, the second capacitor C2, and the third capacitor C3 are all disposed on the aforementioned surface E1 of the dielectric substrate 170, but they are not limited thereto.

Figure 2:
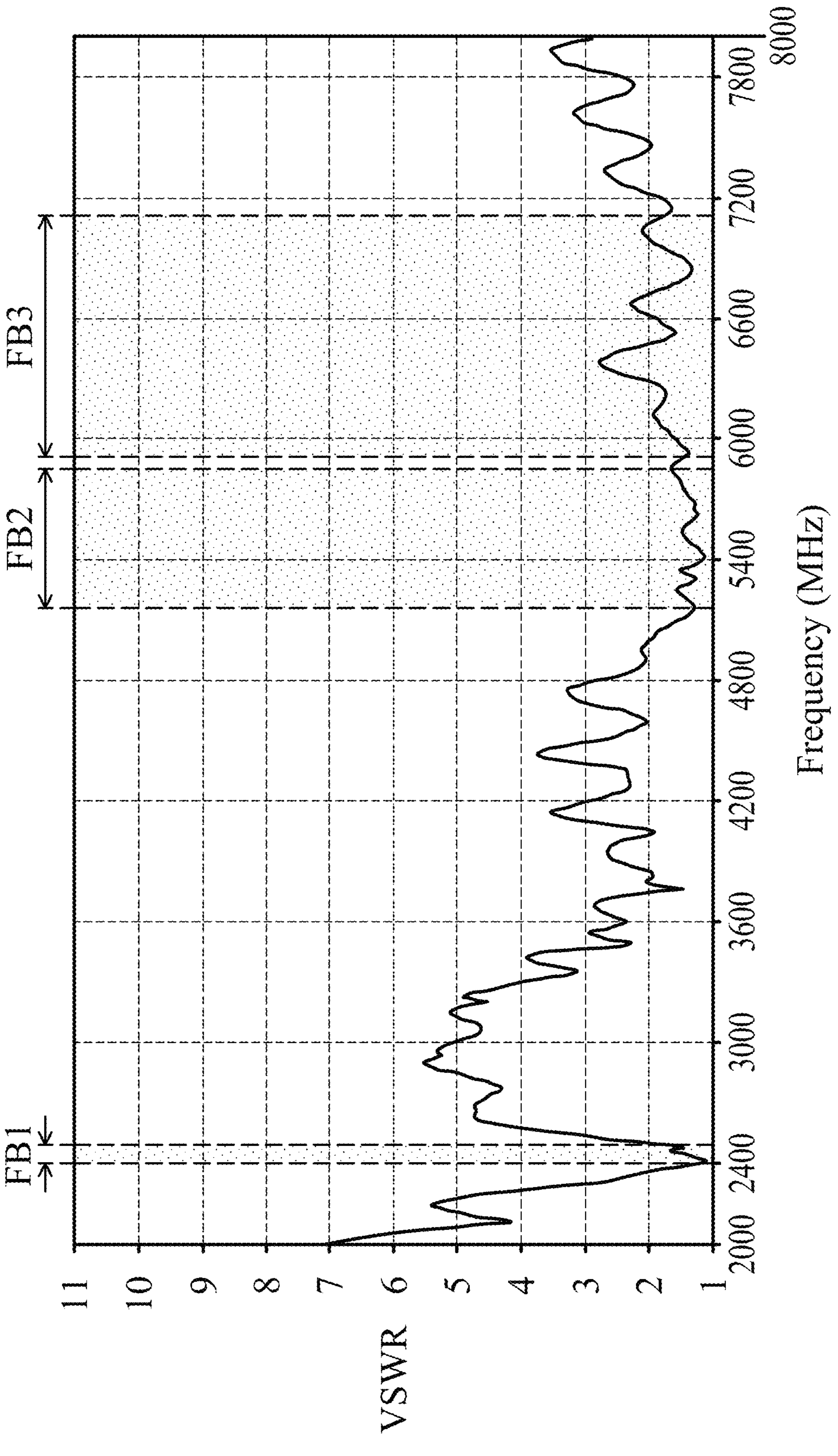
FIG. 2 is a diagram of VSWR (Voltage Standing Wave Ratio) of a hybrid antenna structure according to an embodiment of the disclosure.

FIG. 2 is a diagram of VSWR (Voltage Standing Wave Ratio) of the hybrid antenna structure 100 according to an embodiment of the disclosure. The horizontal axis represents the operational frequency (MHz), and the vertical axis represents the VSWR. According to the measurement of FIG. 2, the hybrid antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the hybrid antenna structure 100 can support the wideband operations of WLAN (Wireless Local Area Networks), Wi-Fi 6E, and Wi-Fi 7.

The operational principles of the hybrid antenna structure 100 of some embodiments are described as follows: An outer loop structure 181 is formed by the feeding radiation element 130, the second capacitor C2, the shorting radiation element 140, the main radiation element 120, and the first capacitor C1. The outer loop structure 181 can be excited to generate the first frequency band FB1. An inner loop structure 182 is formed by the feeding radiation element 130, the second capacitor C2, the shorting radiation element 140, and the third capacitor C3. The inner loop structure 182 can be excited to generate the second frequency band FB2 and the third frequency band FB3. The bending and widening portion 125 of the main radiation element 120 is configured to fine-tune the impedance matching of the first frequency band FB1. The auxiliary radiation element 150 is configured to fine-tune the impedance matching of the second frequency band FB2 and the third frequency band FB3.

According to practical measurements, the inductor LA can prevent alternating currents of the hybrid antenna structure 100 from entering the proximity sensor 160. Furthermore, the first capacitor C1, the second capacitor C2, and the third capacitor C3 can prevent direct current from the proximity sensor 160 from entering the ground element 110. With the proposed design, because the main radiation element 120 used as the sensing pad is well integrated, the hybrid antenna structure 100 can provide the functions of both wideband operation and proximity sense, without additionally increasing the overall device size. It should be also understood that the connection position of the second capacitor C2 is adjustable between the first end 131 and the second end 132 of the feeding radiation element 130. If the connection position of the second capacitor C2 is different, the effective resonant length of the inner loop structure 182 can also be changed, so as to appropriately adjust the frequency shift of the second frequency band FB2 and the third frequency band FB3.

The element sizes and parameters of the hybrid antenna structure 100 of some embodiments are described as follows: The length L1 of the main radiation element 120 may be from 0.25 to 0.5 wavelength (0.25π~0.5λ) of the first frequency band FB1 of the hybrid antenna structure 100, such as about 0.4 wavelength (0.4λ). The length L2 of the feeding radiation element 130 may be from 0.25 to 0.5 wavelength (0.25λ~0.5λ) of the second frequency band FB2 or the third frequency band FB3 of the hybrid antenna structure 100, such as about 0.3 wavelength (0.32). The length L3 of the auxiliary radiation element 140 may be from 0.5 mm to 2.5 mm. The width of the coupling gap GC1 may be form 0.2 mm to 3.5 mm. The width of the coupling gap GC2 may be form 0.5 mm to 1.5 mm. The width of the coupling gap GC3 may be form 0.5 mm to 1.5 mm. The distance D1 between the shorting radiation element 140 and the feeding radiation element 130 may be from 0.2 mm to 2 mm.

The capacitance of the first capacitor C1 may be greater than or equal to 10 pF. The capacitance of the second capacitor C2 may be greater than or equal to 10 pF. The capacitance of the third capacitor C3 may be greater than or equal to 27 pF. The inductance of the inductor LA may be greater than or equal to 30 nH. The above ranges of element sizes and parameters are calculated and obtained according to many experimental results, and they help to optimize the operational bandwidth and the impedance matching of the hybrid antenna structure 100, and also to maximize the detectable distance of the proximity sensor 160.

The following embodiments will introduce different configurations and detailed structural features of the hybrid antenna structure 100. It should be understood that these figures and descriptions are merely exemplary, rather than limitations of the disclosure.

Figure 3:
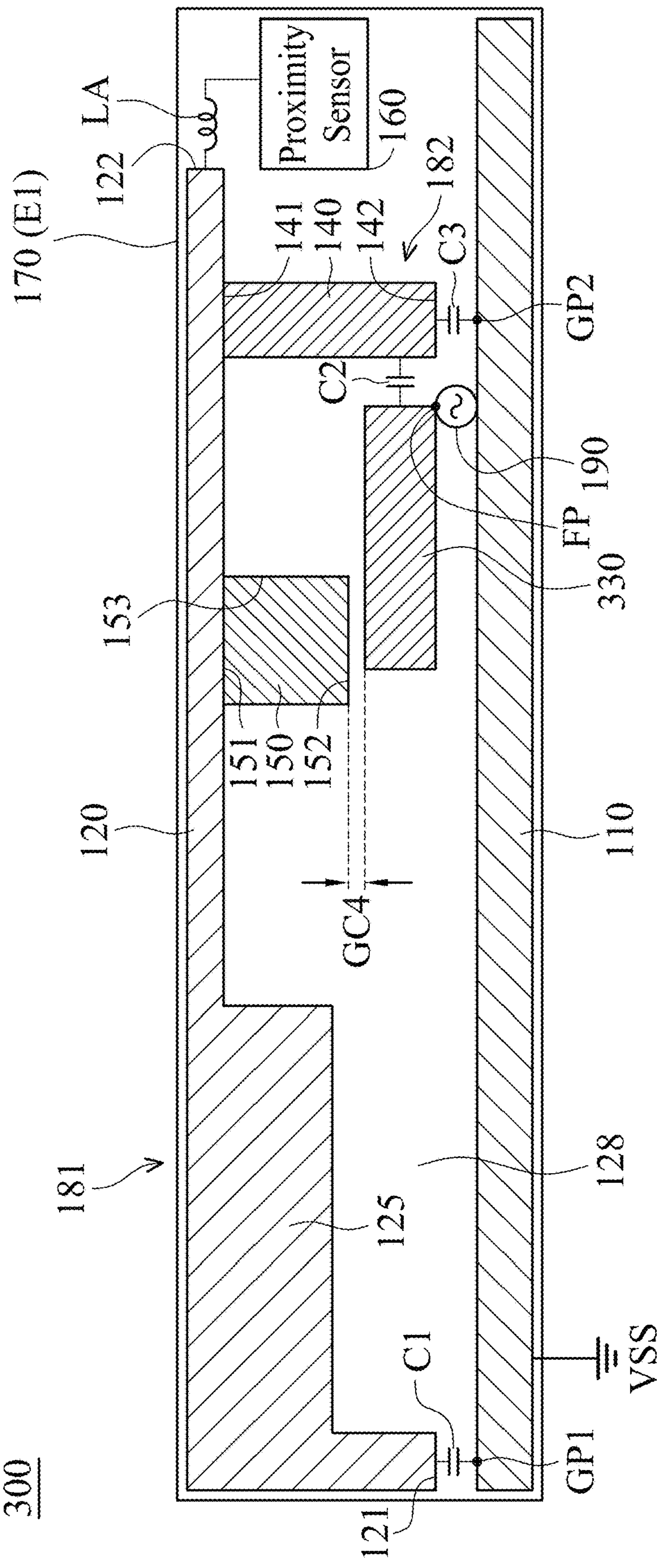
FIG. 3 is a diagram of a hybrid antenna structure according to another embodiment of the disclosure.

FIG. 3 is a diagram of a hybrid antenna structure 300 according to another embodiment of the disclosure. FIG. 3 is similar to FIG. 1. In the embodiment of FIG. 3, a feeding radiation element 330 of the hybrid antenna structure 300 substantially has a simple straight-line shape, and the connection position of the second capacitor C2 is also changed. Since the feeding radiation element 330 does not include any extension portion, there can be only one coupling gap GC4 formed between the auxiliary radiation element 150 and the feeding radiation element 330. According to practical measurements, this design can help to further adjust the impedance matching of the second frequency band FB2 and the third frequency band FB3 of the hybrid antenna structure 300. Other features of the hybrid antenna structure 300 of FIG. 3 are similar to those of hybrid antenna structure 100 of FIG. 1. Accordingly, the two embodiments can achieve similar levels of performance.

The disclosure proposes a novel hybrid antenna structure. In comparison to the conventional design, the disclosure has the advantages of small size, wide bandwidth, proximity sense, high communication quality, and low manufacturing cost. Therefore, the disclosure is suitable for applications in a variety of mobile communication devices.

Note that the above element sizes, element shapes, element parameters, and frequency ranges are not limitations of the disclosure. An antenna designer can fine-tune these settings or values in order to meet specific requirements. It should be understood that the hybrid antenna structure of the disclosure is not limited to the configurations depicted in FIGS. 1-3. The disclosure may merely include any one or more features of any one or more embodiments of FIGS. 1-3. In other words, not all of the features displayed in the figures should be implemented in the hybrid antenna structure of the disclosure.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid antenna structure, comprising:

a ground element;

a main radiation element;

a first capacitor, wherein the main radiation element is coupled through the first capacitor to a first grounding point on the ground element;

a feeding radiation element, having a feeding point;

a second capacitor;

a shorting radiation element, coupled to the main radiation element, and coupled through the second capacitor to the feeding radiation element;

a third capacitor, wherein the shorting radiation element is further coupled through the third capacitor to a second grounding point on the ground element;

an auxiliary radiation element, coupled to the main radiation element, wherein the auxiliary radiation element is adjacent to the feeding radiation element;

an inductor; and a proximity sensor, coupled through the inductor to the main radiation element.

2. The hybrid antenna structure as claimed in claim 1, wherein the main radiation element is configured as a sensing pad of the proximity sensor.

3. The hybrid antenna structure as claimed in claim 1, further comprising:

a dielectric substrate, wherein the ground element, the main radiation element, the feeding radiation element, the shorting radiation element, and the auxiliary radiation element are disposed on the dielectric substrate.

4. The hybrid antenna structure as claimed in claim 1, wherein the main radiation element substantially has a large L-shape.

5. The hybrid antenna structure as claimed in claim 1, wherein the main radiation element further comprises a bending and widening portion.

6. The hybrid antenna structure as claimed in claim 1, wherein the feeding radiation element substantially has a small L-shape.

7. The hybrid antenna structure as claimed in claim 1, wherein the feeding radiation element substantially has a straight-line shape.

8. The hybrid antenna structure as claimed in claim 1, wherein the auxiliary radiation element substantially has a rectangular shape or a square shape.

9. The hybrid antenna structure as claimed in claim 1, wherein a coupling gap is formed between the auxiliary radiation element and the feeding radiation element.

10. The hybrid antenna structure as claimed in claim 1, wherein the hybrid antenna structure covers a first frequency band, a second frequency band, and a third frequency band.

11. The hybrid antenna structure as claimed in claim 10, wherein the first frequency band is from 2400 MHz to 2500 MHz, the second frequency band is from 5150 MHz to 5850 MHz, and the third frequency band is from 5925 MHz to 7125 MHz.

12. The hybrid antenna structure as claimed in claim 10, wherein a length of the main radiation element is from 0.25 to 0.5 wavelength of the first frequency band.

13. The hybrid antenna structure as claimed in claim 10, wherein a length of the feeding radiation element is from 0.25 to 0.5 wavelength of the second frequency band or the third frequency band.

14. The hybrid antenna structure as claimed in claim 10, wherein an outer loop structure is formed by the feeding radiation element, the second capacitor, the shorting radiation element, the main radiation element, and the first capacitor.

15. The hybrid antenna structure as claimed in claim 14, wherein the outer loop structure is excited to generate the first frequency band.

16. The hybrid antenna structure as claimed in claim 1, wherein an inner loop structure is formed by the feeding radiation element, the second capacitor, the shorting radiation element, and the third capacitor.

17. The hybrid antenna structure as claimed in claim 16, wherein the inner loop structure is excited to generate the second frequency band and the third frequency band.

18. The hybrid antenna structure as claimed in claim 1, wherein a capacitance of each of the first capacitor and the second capacitor is greater than or equal to 10 pF.

19. The hybrid antenna structure as claimed in claim 1, wherein a capacitance of the third capacitor is greater than or equal to 27 pF.

20. The hybrid antenna structure as claimed in claim 1, wherein an inductance of the inductor is greater than or equal to 30 nH.

* * * * *